(12) United States Patent
Toncich et al.

(10) Patent No.: US 8,929,957 B2
(45) Date of Patent: Jan. 6, 2015

(54) REDUCED JAMMING BETWEEN RECEIVERS AND WIRELESS POWER TRANSMITTERS

(75) Inventors: Stanley S. Toncich, San Diego, CA (US); Philip D. Coan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 298 days.

(21) Appl. No.: 12/613,374

(22) Filed: Nov. 5, 2009

(65) Prior Publication Data

US 2010/0151808 A1    Jun. 17, 2010

Related U.S. Application Data

(60) Provisional application No. 61/117,027, filed on Nov. 21, 2008.

(51) Int. Cl.

| | |
|---|---|
| H04B 1/00 | (2006.01) |
| H04B 15/00 | (2006.01) |
| H04B 17/00 | (2006.01) |
| H04B 1/38 | (2006.01) |
| H04M 1/00 | (2006.01) |
| H02J 7/02 | (2006.01) |
| H02J 5/00 | (2006.01) |

(52) U.S. Cl.
CPC *H02J 7/025* (2013.01); *H02J 5/005* (2013.01)
USPC .......................... 455/573; 455/67.11; 455/63.1

(58) Field of Classification Search
CPC ......... H02J 7/025; H04B 1/10; H04B 1/0475; H04B 15/00; H04B 17/003; H04W 52/243
USPC ........ 455/501, 63.1, 67.11, 66.1, 67.13, 67.7, 455/573, 574, 41.2, 41.1
See application file for complete search history.

(56) References Cited

U.S. PATENT DOCUMENTS 5,987,326 A * 11/1999 Tiedemann et al. .......... 455/442
6,967,462 B1 * 11/2005 Landis ........................... 320/101
(Continued)

FOREIGN PATENT DOCUMENTS

| CN | 101233666 A | 7/2008 |
|---|---|---|
| JP | H11168837 | 6/1999 |

(Continued)

OTHER PUBLICATIONS

International Search Report and the Written Opinion—PCT/US2009/065583, International Search Authority—European Patent Office—Feb. 25, 2010.

*Primary Examiner* — Andrew Wendell
(74) *Attorney, Agent, or Firm* — Knobbe Martens Olson & Bear LLP

(57) ABSTRACT

Exemplary embodiments are directed to reducing jamming caused by radiated fields generated by wireless power transmitters. Exemplary embodiments include detecting a jamming condition of a wireless power receiving device resulting from a radiated field from a wireless power transmitter of a charging device. Such embodiments include synchronizing the wireless power coupling with communication of the wireless power receiving device. Synchronizing wireless power coupling may include wireless power coupling at a first level when the wireless power receiving device is expected to receive a signal on a communication channel. Synchronizing wireless power coupling may further include coupling at a higher rate when the wireless power receiving device is not expected to receive a signal on the communication channel.

32 Claims, 6 Drawing Sheets

(56) References Cited

U.S. PATENT DOCUMENTS

| | | | |
|---|---|---|---|
| 7,212,110 B1* | 5/2007 | Martin et al. | 340/539.12 |
| 7,514,899 B2 | 4/2009 | Deng-Peng | |
| 7,586,863 B2 | 9/2009 | Tu et al. | |
| 7,598,704 B2 | 10/2009 | Taniguchi et al. | |
| 7,741,734 B2 | 6/2010 | Joannopoulos et al. | |
| 7,825,543 B2 | 11/2010 | Karalis et al. | |
| 8,159,364 B2* | 4/2012 | Zeine | 340/693.1 |
| 8,594,567 B2* | 11/2013 | Finkenzeller et al. | 455/41.2 |
| 2005/0043026 A1* | 2/2005 | Brok et al. | 455/434 |
| 2006/0184705 A1 | 8/2006 | Nakajima | |
| 2007/0049316 A1* | 3/2007 | Beming et al. | 455/522 |
| 2008/0143580 A1 | 6/2008 | Glazko et al. | |
| 2008/0211455 A1 | 9/2008 | Park et al. | |
| 2009/0312046 A1* | 12/2009 | Clevenger et al. | 455/522 |

FOREIGN PATENT DOCUMENTS

| | | |
|---|---|---|
| JP | 2001102974 | 4/2001 |
| JP | 2003134681 | 5/2003 |
| JP | 2004252562 A | 9/2004 |
| JP | 2005006440 A | 1/2005 |
| JP | 2006201959 A | 8/2006 |
| JP | 2006229583 A | 8/2006 |
| JP | 2007501600 A | 1/2007 |
| JP | 2008118575 A | 5/2008 |
| JP | 2008131812 | 6/2008 |
| JP | 2008206297 A | 9/2008 |
| JP | 2009504117 A | 1/2009 |
| WO | WO03105308 A1 | 12/2003 |
| WO | WO2004105208 | 12/2004 |
| WO | WO2005099109 A1 | 10/2005 |
| WO | WO2007015599 | 2/2007 |

\* cited by examiner

REDUCED JAMMING BETWEEN RECEIVERS AND WIRELESS POWER TRANSMITTERS

CLAIM OF PRIORITY UNDER 35 U.S.C. §119

This application claims priority under 35 U.S.C. §119(e) to:

U.S. Provisional Patent Application 61/117,027 entitled "REDUCED JAMMING BETWEEN RADIO RECEIVERS AND WIRELESS POWER TRANSMITTERS" filed on Nov. 21, 2008, and assigned to the assignee hereof and hereby expressly incorporated by reference herein.

BACKGROUND

1. Field

The present invention relates generally to wireless charging, and more specifically to devices, systems, and methods related to wireless power chargers.

2. Background

Typically, each battery powered device such as a wireless communication device (e.g., a cell-phone) requires its own charger and power source, which is usually the AC power outlet. This becomes unwieldy when many devices need charging, each requiring its own separate charger.

Approaches are being developed that use over-the-air or wireless power transmission between a transmitter and a receiver coupled to the electronic device to be charged. Wireless power transmission using radio frequency (RF) is one method considered as an un-tethered means for charging the batteries of portable wireless electronic devices. In wireless power transmission, an off-board RF transmitter and antenna radiates RF energy to the device to be charged. The device to be charged has a receive antenna and circuitry that converts the RF power to DC current that can charge the device's battery, or alternatively, can directly power the device. The distance between the transmitting and receiving antenna, at which efficient energy transfer can take place, is a function of the RF frequencies of operation and the antenna sizes. The coupling efficiency may be significantly improved if the antennas are sized and operated at such a frequency that they are physically within the so-called "near-field zone" of each other. This often necessitates that that both antennas operate at frequencies where the antennas are electrically small (e.g., largest dimension <0.1 wavelengths).

Under conditions of wireless power coupling, there may exist a significant amount of power transmitted by the transmitter to be received by the wireless power receiving device. For communication devices their jamming conditions may result from transmitter harmonics, inter-modulation products in the wireless power receiving device, high voltages generated in the wireless power receiving device, communication receiver antenna detuning while receiving wireless power or through baseband coupling in the wireless power receiving device. This energy created by wireless power coupling may cause problems in the receiver such as jamming which may prevent the wireless power receiving device from effectively communicating such as in making or receiving calls, maintaining an existing call, or establishing other communication links.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted from a transmitter to a receiver without the use of physical electromagnetic conductors.

Figure 1:
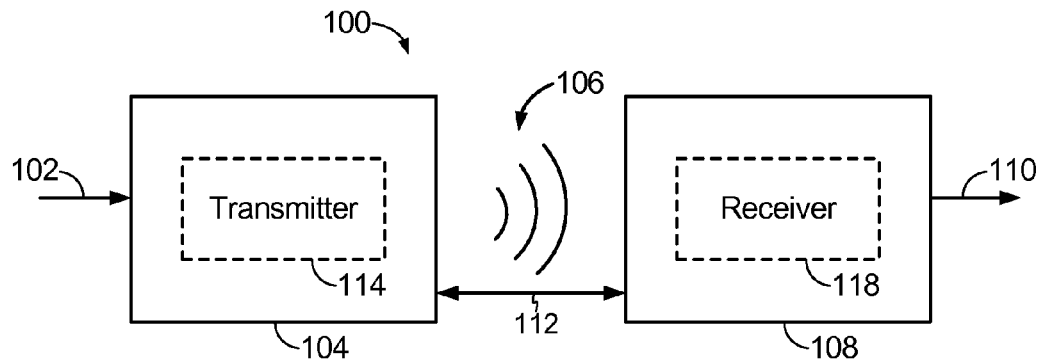
FIG. 1 illustrates a simplified block diagram of a wireless power transfer system.

FIG. 1 illustrates wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are exactly identical, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far-field. When in this near-field a coupling mode may be developed between the transmit antenna 114 and the receive antenna 118. The area around the antennas 114 and 118 where this near-field coupling may occur is referred to herein as a coupling-mode region.

Figure 2:
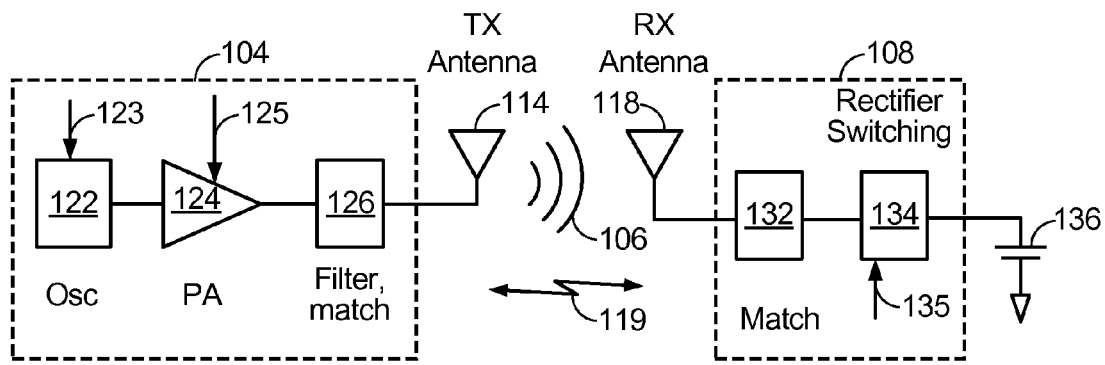
FIG. 2 illustrates a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate an oscillator signal at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit to generate a DC power output to charge a battery 136 as shown in FIG. 2 or power a device coupled to the receiver (not shown). The matching circuit 132 may be included to match the impedance of the receiver 108 to the receive antenna 118.

Figure 3:
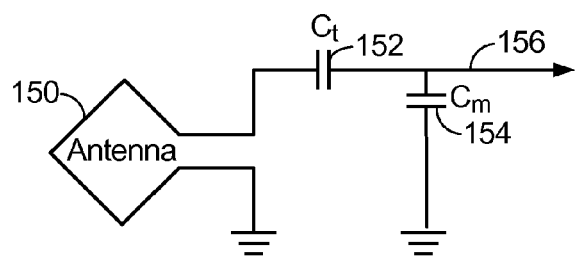
FIG. 3 illustrates a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems because magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna may be operated at a frequency that is low enough and with an antenna size that is large enough to achieve good coupling (e.g., >−4 dB) to a small Rx antenna at significantly larger distances than allowed by far-field and inductive approaches mentioned earlier. If the Tx antenna is sized correctly, high coupling levels (e.g., −1 to −4 dB) may be achieved when the Rx antenna on a host device is placed within a coupling-mode region (i.e., in the near-field) of the driven Tx loop antenna.

Figure 4:
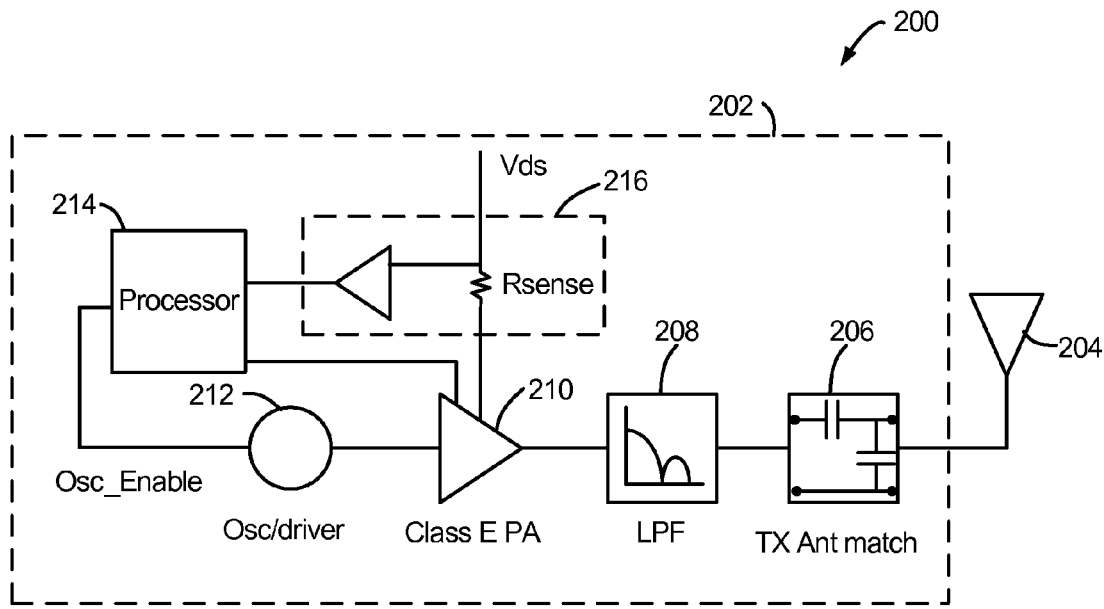
FIG. 4 is a simplified block diagram of a transmitter, in accordance with an exemplary embodiment of the present invention.

FIG. 4 is a simplified block diagram of a transmitter, in accordance with an exemplary embodiment of the present invention. A transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the antenna or DC current draw by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 to 8.0 Watts.

Transmit circuitry 202 further includes a processor 214 for enabling the oscillator 212 during transmit phases (or duty cycles) for specific receivers, for adjusting the frequency of the oscillator, and for adjusting the output power level for implementing a communication protocol for interacting with neighboring devices through their attached receivers. As will be discussed later, processor 214 may control operation of a wireless power transmitter to reduce or shut off transmission of the generated wireless power field in order to synchronize wireless power coupling with communication data reception of a wireless power receiving device. The reduction or shutting off of wireless power transmission may be in response to a prior detection regarding the generated field of the transmitter to be a cause of jamming on the wireless power receiving device.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by processor 214 for use in determining whether to enable the oscillator 212 for transmitting energy to communicate with an active receiver.

Transmit antenna 204 may be implemented as an antenna strip with the thickness, width and metal type selected to keep resistive losses low. In a conventional implementation, the transmit antenna 204 may generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or large in length of a side if a square loop, (e.g., 0.50 meters) relative to the receive antenna, the transmit antenna 204 will not necessarily need a large number of turns to obtain a reasonable capacitance.

Figure 5:
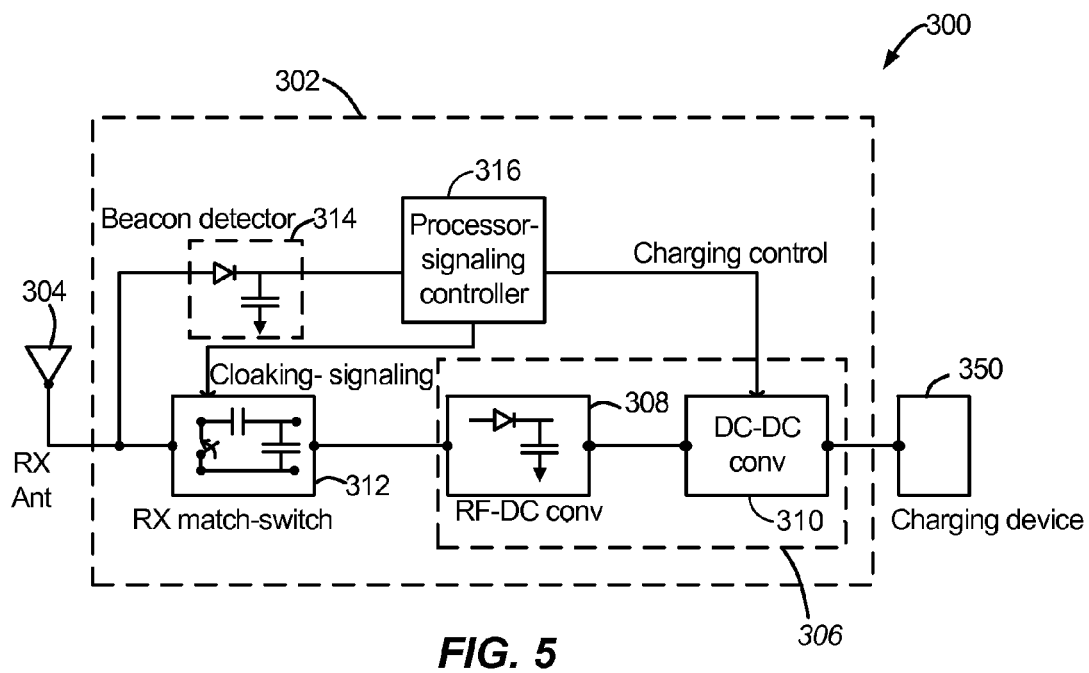
FIG. 5 is a simplified block diagram of a receiver, in accordance with an exemplary embodiment of the present invention.

FIG. 5 is a block diagram of a receiver, in accordance with an exemplary embodiment of the present invention. A receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or near the same frequency, as transmit antenna 204 (FIG. 4). Receive antenna 304 may be similarly dimensioned with transmit antenna 204 or may be differently sized based upon the dimensions of an associated device 350. By way of example, device 350 may be a portable electronic device having a diametric or a length dimension smaller that the diameter or length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 may include an RF-to-DC converter 308 and may also include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 4) as is explained more fully below. As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking." Furthermore, this switching between unloading and loading controlled by receiver 300 and detected by transmitter 200 provides a communication mechanism from receiver 300 to transmitter 200 as is explained more fully below. Additionally, a protocol may be associated with the switching which enables the sending of a message from receiver 300 to transmitter 200. By way of example, a switching speed may be on the order of 100 μsec.

In an exemplary embodiment, communication between the transmitter 200 and the receiver 300 refers to a device sensing and charging control mechanism, rather than conventional two-way communication. In other words, the transmitter 200 may use on/off keying of the transmitted signal to adjust the availability of energy in the near-field. The receiver 300 interprets these changes in energy as a coded message from the transmitter 200. From the receiver side, the receiver 300 uses tuning and de-tuning of the receive antenna 304 to adjust how much power is being accepted from the near-field. The transmitter 200 may detect this difference in power used from the near-field and interpret these changes as a message from the receiver 300.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. As will be discussed later, cloaking may occur upon the occurrence of synchronization of the wireless power transmission with reception of communication data, and in the process of monitoring and detecting jamming caused by the wireless power transmitter. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Figure 6A:
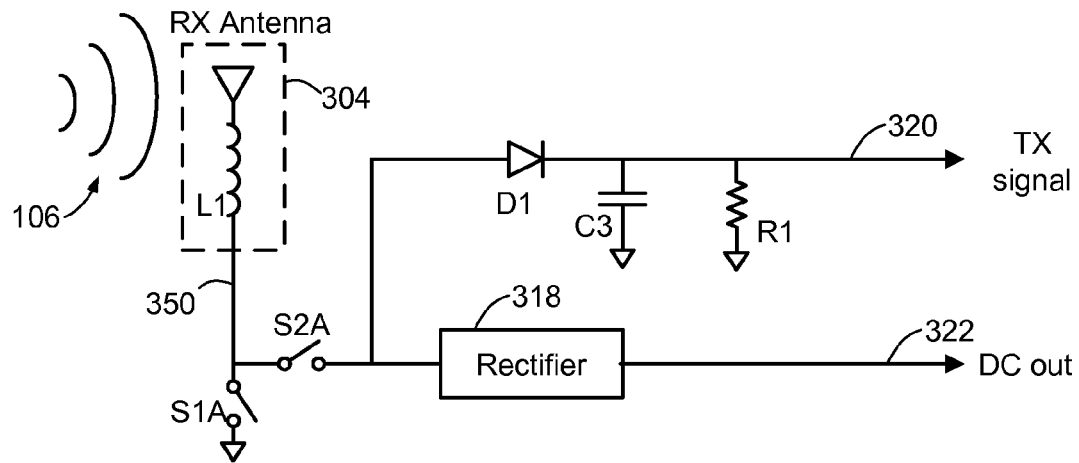
FIGS. 6A-6C show simplified schematics of a portion of receive circuitry in various states to illustrate messaging between a receiver and a transmitter.
Figure 6B:
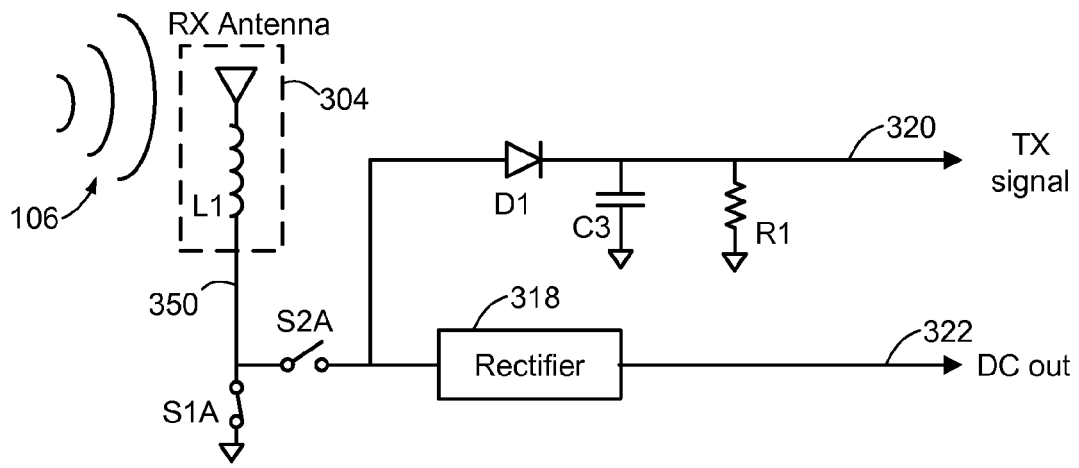
Figure 6C:
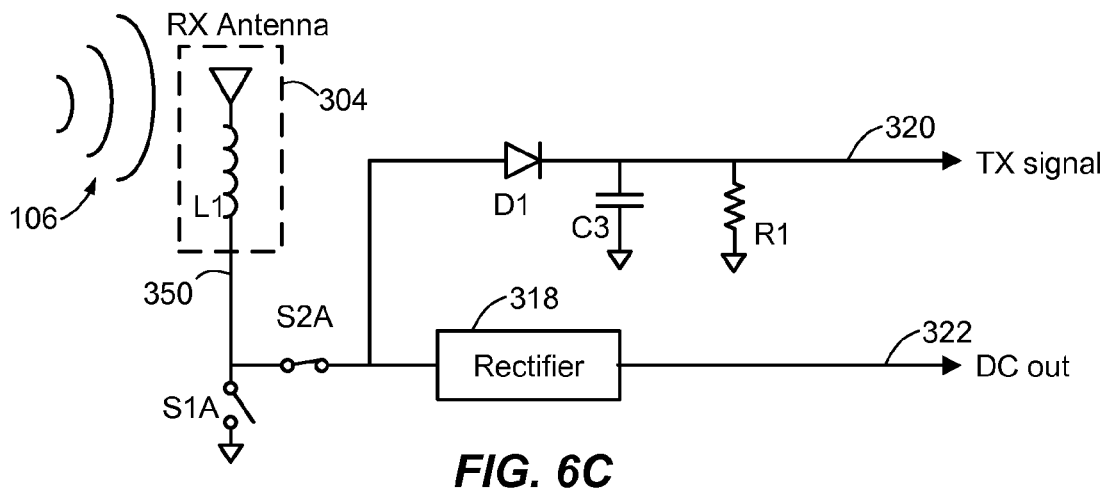

FIGS. 6A-6C show a simplified schematic of a portion of receive circuitry in various states to illustrate messaging between a receiver and a transmitter. All of FIGS. 6A-6C show the same circuit elements with the difference being state of the various switches. A receive antenna 304 includes a characteristic inductance L1, which drives node 350. Node 350 is selectively coupled to ground through switch S1A. Node 350 is also selectively coupled to diode D1 and rectifier 318 through switch S1B. The rectifier 318 supplies a DC power signal 322 to a receive device (not shown) to power the receive device, charge a battery, or a combination thereof. The diode D1 is coupled to a transmit signal 320 which is filtered to remove harmonics and unwanted frequencies with capacitor C3 and resistor R1.

In the exemplary embodiments of FIGS. 6A-6C, the current draw through the transmitter may be changed by modifying the state of switches S1A and S2A. In FIG. 6A, switch S1A and switch S2A are both open creating a "DC open state" and essentially removing the load from the transmit antenna 204. This reduces the current seen by the transmitter.

In FIG. 6B, switch S1A is closed and switch S2A is open creating a "DC short state" for the receive antenna 304. Thus the state in FIG. 6B may be used to increase the current seen by the transmitter.

In FIG. 6C, switch S1A is open and switch S2A is closed creating a normal receive mode (also referred to herein as a "DC operating state") wherein power may be supplied by the DC out signal 322 and a transmit signal 320 may be detected. In the state shown in FIG. 6C the receiver receives a normal amount of power, thus consuming more or less power from the transmit antenna than the DC open state or the DC short state.

Reverse link signaling may be accomplished by switching between the DC operating state (FIG. 6C) and the DC short state (FIG. 6B). Reverse link signaling also may be accomplished by switching between the DC operating state (FIG. 6C) and the DC open state (FIG. 6A).

Figure 7A:
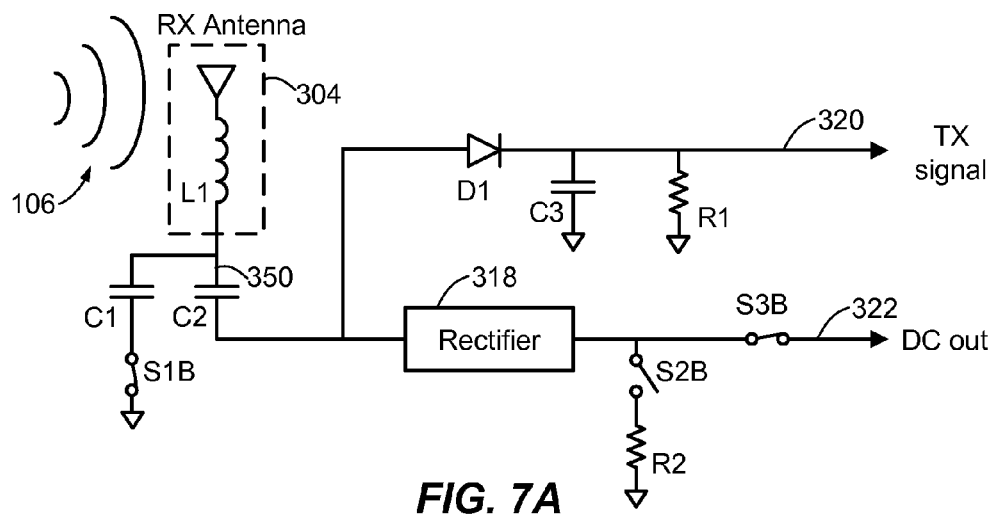
FIGS. 7A-7C show simplified schematics of a portion of alternative receive circuitry in various states to illustrate messaging between a receiver and a transmitter.
Figure 7B:
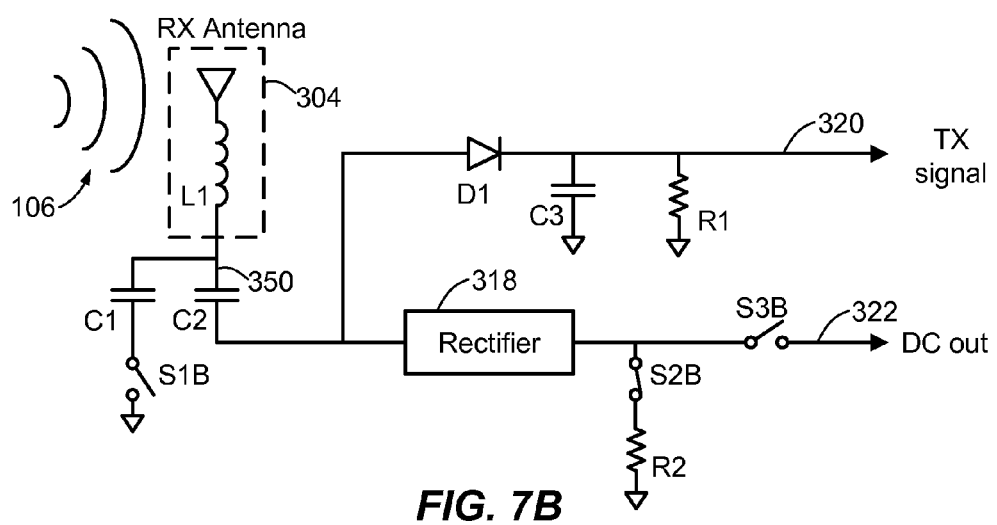
Figure 7C:
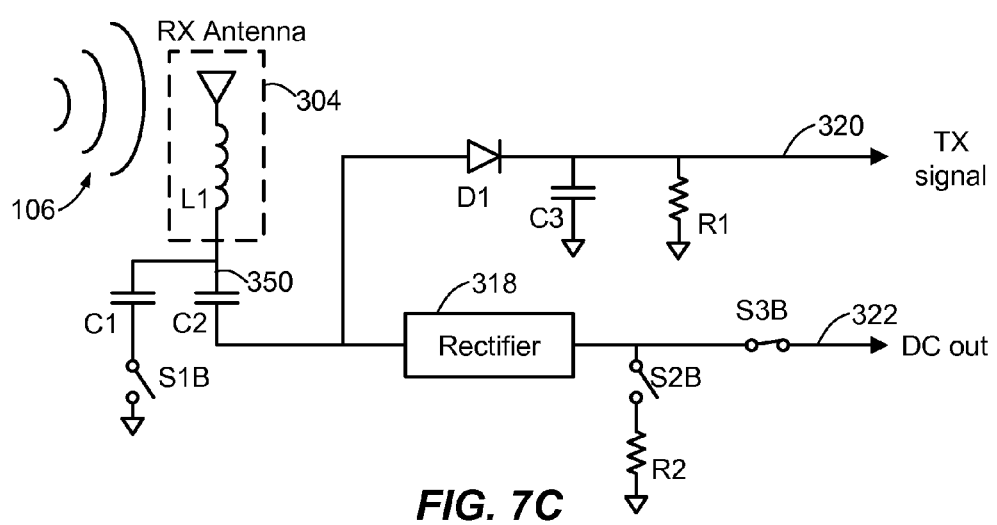

FIGS. 7A-7C shows a simplified schematic of a portion of alternative receive circuitry in various states to illustrate messaging between a receiver and a transmitter. All of FIGS. 7A-7C show the same circuit elements with the difference being the state of the various switches. A receive antenna 304 includes a characteristic inductance L1, which drives node 350. Node 350 is selectively coupled to ground through capacitor C1 and switch S1B. Node 350 is also AC coupled to diode D1 and rectifier 318 through capacitor C2. The diode D1 is coupled to a transmit signal 320 which is filtered to remove harmonics and unwanted frequencies with capacitor C3 and resistor R1.

The rectifier 318 is connected to switch S2B, which is connected in series with resistor R2 and ground. The rectifier 318 also is connected to switch S3B. The other side of switch S3B supplies a DC power signal 322 to a receive device (not shown) to power the receive device, charge a battery, or a combination thereof.

In FIGS. 6A-6C the DC impedance of the receive antenna 304 is changed by selectively coupling the receive antenna to ground through switch S1B. In contrast, as illustrated in the exemplary embodiments of FIGS. 7A-7C, the impedance of the antenna may be modified to generate the reverse link signaling by modifying the state of switches S1B, S2B, and S3B to change the AC impedance of the receive antenna 304. In FIGS. 7A-7C the resonant frequency of the receive antenna 304 may be tuned with capacitor C2. Thus, the AC impedance of the receive antenna 304 may be changed by selectively coupling the receive antenna 304 through capacitor C1 using switch S1B, essentially changing the resonance circuit to a different frequency that will be outside of a range that will optimally couple with the transmit antenna. If the resonance frequency of the receive antenna 304 is near the resonant frequency of the transmit antenna, and the receive antenna 304 is in the near-field of the transmit antenna, a coupling mode may develop wherein the receiver may draw significant power from the radiated field 106.

In FIG. 7A, switch S1B is closed, which de-tunes the antenna and creates an "AC cloaking state," essentially "cloaking" the receive antenna 304 from detection by the transmit antenna 204 because the receive antenna does not resonate at the transmit antenna's frequency. Because the receive antenna will not be in a coupled mode, the state of switches S2B and S3B are not particularly important to the present discussion.

In FIG. 7B, switch S1B is open, switch S2B is closed, and switch S3B is open, creating a "tuned dummy-load state" for the receive antenna 304. Because switch S1B is open, capacitor C1 does not contribute to the resonance circuit and the receive antenna 304 in combination with capacitor C2 will be in a resonance frequency that may match with the resonant frequency of the transmit antenna. The combination of switch S3B open and switch S2B closed creates a relatively high current dummy load for the rectifier, which will draw more power through the receive antenna 304, which may be sensed by the transmit antenna. In addition, the transmit signal 320 may be detected because the receive antenna is in a state to receive power from the transmit antenna.

In FIG. 7C, switch S1B is open, switch S2B is open, and switch S3B is closed, creating a "tuned operating state" for the receive antenna 304. Because switch S1B is open, capacitor C1 does not contribute to the resonance circuit and the receive antenna 304 in combination with capacitor C2 will be in a resonance frequency that may match with the resonant frequency of the transmit antenna. The combination of switch S2B open and switch S3B closed creates a normal operating state wherein power may be supplied by the DC out signal 322 and a transmit signal 320 may be detected.

Reverse link signaling may be accomplished by switching between the tuned operating state (FIG. 7C) and the AC cloaking state (FIG. 7A). Reverse link signaling also may be accomplished by switching between the tuned dummy-load state (FIG. 7B) and the AC cloaking state (FIG. 7A). Reverse link signaling also may be accomplished by switching between the tuned operating state (FIG. 7C) and the tuned dummy-load state (FIG. 7B) because there will be a difference in the amount of power consumed by the receiver, which may be detected by the load sensing circuit in the transmitter.

Of course, those of ordinary skill in the art will recognize that other combinations of switches S1B, S2B, and S3B may be used to create cloaking, generate reverse link signaling and supplying power to the receive device. In addition, the switches S1A and S1B may be added to the circuits of FIGS. 7A-7C to create other possible combinations for cloaking, reverse link signaling, and supplying power to the receive device.

Figure 8:
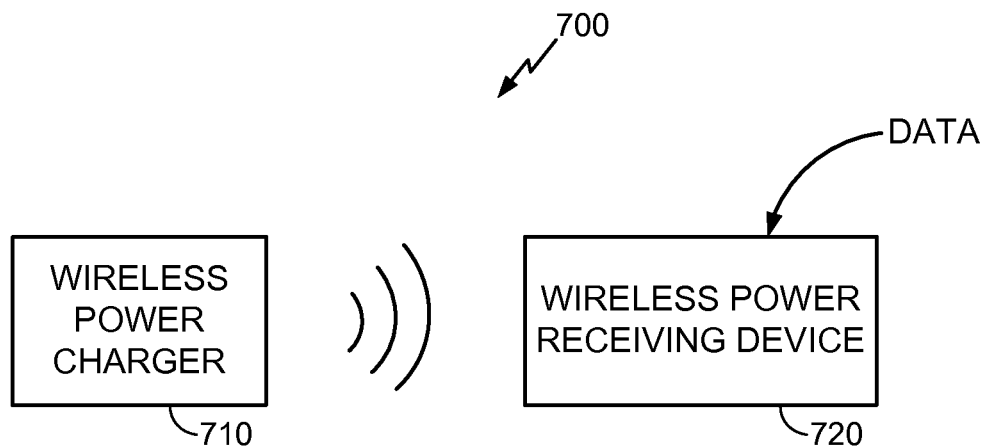
FIG. 8 illustrates a wireless charging system, according to an exemplary embodiment of the present invention.

FIG. 8 illustrates a wireless charging system 700, according to an exemplary embodiment of the present invention. Wireless charging system 700 includes wireless power charger 710, and wireless power receiving device 720. When coupled, wireless power charger 710 charges wireless power receiving device 720 as is discussed in reference to the transmitters (104, 200) and receivers (108, 300) in FIGS. 1-7.

Referring specifically to FIG. 8 in light of FIGS. 1 and 2, wireless power charger 710 includes a transmitter (e.g., 104) for generating a radiated field (e.g., 106) for providing energy transfer. Wireless power receiving device 720 includes a receiver (e.g., 108) for coupling to the radiated field 106 and generating an output power (e.g., 110) for storing or consumption by the wireless power receiving device 720.

Wireless power receiving devices 720 may include mobile devices such as cell phones, personal digital assistants (PDAs), audio/visual players, cameras, lap top computers, combinations thereof, and other personal electronic devices in which wireless power may be received. Wireless power receiving devices 720 may also include less mobile items such as televisions, personal computers, DVD players, Blu-ray players, or any other device that may run off of, or store electrical power.

Wireless power receiving device 720 may also include a communication channel configured to receive communication data from an external source. Such examples of external sources sending data may include from a base station, satellite, server, personal computer, or from other nearby personal electronic devices which may communicate with wireless power receiving device 720. Embodiments of the present invention may include receiving communication from a variety of physical layers, including WCDMA, CDMA2000, GPS, 802.11 Wi-Fi, LTE, LTE Advanced, Bluetooth, and the like. Communication data may include data with commands or instructions for the wireless power receiving device 720, or to be relayed by the wireless power receiving device 720. Communication data may also include data signals which may be converted to audio or visual signals to be perceived by a human, or other such communication data received by the wireless power receiving device 720.

For example, in a wireless communication system, wireless communication devices may be paged by associated base stations to initiate communications. Such wireless communication devices may be configured as a wireless power receiving device 720, however, the purpose for this example is to illustrate paging within a general wireless communication system framework. As such, a general reference is made to wireless communication devices which receive communication via a wireless communication link. In other words, wireless communication devices, as used herein, includes wireless power receiving devices 720 if the wireless communication device is configured as such.

By way of implementing such paging by the base stations to wireless communication devices, the base stations may have a channel on the downlink called the paging channel. In exemplary paging arrangements, the paging channel may be subdivided into a plurality of paging time slots. A group of wireless communication devices may be allocated a paging time slot of a prescribed periodicity for receiving paging messages from associated base stations. Each wireless communication device may be expected to monitor for paging messages from an associated base station during these paging time slots. The periodicity of the paging time slots may be made sufficiently long that each of the wireless communication devices can effectively turn off most of the wireless communication device's circuitry between the designated paging time slots and, thus, save energy. Turning off the circuitry between such paging time slots is referred to as the wireless communication device entering a so-called "sleep" mode. The wireless communication device, even though in sleep mode, may still keep track of the received paging time slots. The wireless communication device may be caused to "wake up" prior to the arrival of the wireless communication device's designated paging time slot, tune to the downlink channel, and achieve carrier, timer, and frame synchronization. The wireless communication device may then decode the paging time slot. If the wireless communication device's identifier is included in the wireless communication device's designated paging time slot, the wireless communication device may know that the paging message is meant for that particular wireless communication device. The wireless communication device may then take the appropriate action indicated in the paging message. If the paging message is not meant for that particular wireless communication device, the wireless communication device returns to sleep mode, and waits for the paging time slot to be received. Such paging time slots may be interfered with by energy fields generated by the coupling of a wireless power transmitter and receiver pair.

Additionally, during an on-going communication transmission, such as a wireless phone call, packets of data may be transmitted to the wireless communication device over available communication channels. These data packet transmissions during an actual call may also be interfered with by energy fields generated by the coupling of a wireless power transmitter and receiver pair. Such a call may occur if the wireless communication device is in communication at the same time as being within a charging field (e.g., speaker phone, call routed through a Bluetooth device, etc.).

In order to reduce the effects of jamming created by wireless power coupling, or generally by the radiated field generated by a wireless power transmitter, the wireless charging system 700 may be configured to detect the existence of jamming at the receiver caused by the wireless power charger 710. For example, the wireless power receiving device 720 may monitor the wireless power receiving device's 720 communication channels, such as on the paging indicator channel (PICH) when receiving pages, or the wireless power receiving device's 720 forward and downlink communication channels during a call. One metric to monitor communication channels for jamming is to measure the energy to interference ratio of the PICH or the signal to noise ratio of the forward link channel. If one of these ratios falls below a satisfactory threshold, then the wireless power receiving device 720 may be experiencing jamming caused by the wireless power charger 710. To be more certain that the wireless power charger 710 is a significant contributor to the jamming, the coupling levels for wireless power coupling between the wireless power charger 710 and the wireless power receiving device 720 may be sufficiently reduced, or even completely shut off, whereupon the wireless power charging system 700 may be configured to re-measure the interference or noise at the communication channel.

Wireless power coupling levels may be reduced or shut off by cloaking as previously described, such as by de-tuning the antenna of the receiver (e.g., 108). In that case, the transmitter (e.g., 104) from the wireless power charger 710 may still generate a radiated field (e.g., 106), which may not completely eliminate the jamming effects of the wireless power charger 710. However, de-tuning the antenna in the receiver may be desirable if multiple wireless power receiving devices are simultaneously being charged by the same wireless power charger 710. By simply de-tuning the antenna in the receiver, some of the interfering effects of the wireless power charger 710 may be reduced or eliminated while also allowing other existing wireless power receiving devices to remain in a charging state.

Additionally, or in the alternative, a command may be transmitted to the wireless power charger 710 to reduce the power level of, or shut off, the radiated field generated by the transmitter of the wireless power charger 710. The command may be transmitted from the wireless power receiving device

720. Alternatively, a different device (not shown) may send such a command to the wireless power charger 710.

With the wireless power coupling at a reduced level, if the re-measured jamming measurements remain below the satisfactory threshold, then the wireless charging system 700 may determine that the wireless power coupling is not a contributor (or at least not the only contributor) to the jamming experienced by the wireless power receiving device 720. If however, the re-measured jamming measurements increase to be above the satisfactory level with the wireless power coupling off or reduced, the wireless charging system 700 may determine that the wireless power transmission is, in fact, a major contributor to the jamming experienced by the wireless power receiving device 720. In that event, the wireless charging system 700 may be further configured to synchronize the wireless power coupling between the wireless power charger 710 and the wireless power receiving device 720.

Synchronization may occur by maintaining wireless power coupling at a first level at times when communication data is not expected by the wireless power receiving device 720, and reducing wireless power coupling levels during time intervals when communication data is expected to be sent or received by the wireless power receiving device 720. Such time intervals for expected communication data may be, for example, at 'waking up' to receive paging time slots, but also for transmission of data packets during communication links such as during a call. As will be understood by one or ordinary skill in the art, other examples for expected communication data may include assigned downlink symbol times in FDD LTE systems or receive time slots in TDD systems, such as GSM, LTE TDD, and TD-SCDMA. Synchronization may include de-coupling the wireless power charger 710 and the wireless power receiving device 720, which may include de-tuning the receiver antenna of the wireless power receiving device 720, "muting" the transmitter of the wireless power charger 710, or any combination thereof.

Muting the transmitter may include reducing the strength of the radiated field generated by the wireless power transmitter of the wireless power charger 710, or completely turning the transmitter off during the desired time intervals for communication by the wireless power receiving device 720. Thus, the wireless power receiving device 720 may be configured to issue a command to the transmitter to stop transmitting at periods of time when the wireless power receiving device 720 would like to receive data on wireless power receiving device's 720 communication channels. In other words, the wireless power receiving device 720 may control the wireless power transmitter of the wireless power charger 710 to mute the transmit power at these crucial times of communication. A different device may send such commands to wireless power charger 710.

In another exemplary embodiment, the wireless power transmitter may be muted during the paging channel time slots via predicted charging. During predicted charging, the paging channel time slot information for a wireless power receiving device 720 may be pre-stored in the wireless power charger 710 when the wireless power receiving device 720 is being charged. This may reduce the need for continuous communication between the wireless power charger 710 and the wireless power receiving device 720 or a different device. Thus, in exemplary embodiments of the present invention the wireless power charging system 700 may be configured for detecting the jamming condition in the wireless power receiving device 720. The wireless power charging system 700 may be further configured to synchronize wireless power coupling between the wireless power transmitter of the wireless power charger 710 with the wireless power receiver of the wireless power receiving device 720 in order to reduce or eliminate the jamming caused by the field generated by the wireless power transmitter.

Figure 9:
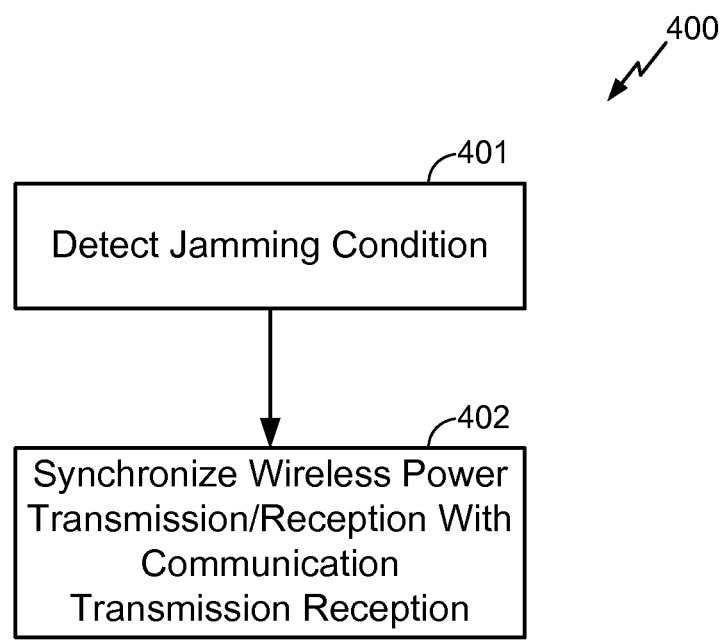
FIG. 9 is a flow chart illustrating a method of reducing jamming effects of a receiver, according to an exemplary embodiment of the present invention.

FIG. 9 illustrates a flow chart 400 for a method of reducing jamming effects of a receiver according to an embodiment of the present invention. A jamming condition of the wireless power receiving device is detected 401. Jamming may be a result of interferences caused by harmonic energy, inter-modulation products, high voltages, or baseband coupling. Detecting the jamming condition may include monitoring the jamming effects of a wireless power transmitter on the energy or signal strength of communication channels in comparison to the interference or noise on those channels.

The coupling (e.g., wireless power transmission/reception) between wireless power transmitter in the wireless power charger 710 and wireless power receiver on the wireless power receiving device 720 may be synchronized 402 with receiving or transmitting communication data by the wireless power receiving device. This synchronization may be responsive to the determination that the jamming condition of the wireless power receiving device 720 is present. Synchronizing 402 may include reducing the wireless power coupling during time intervals of expected communication data exchange on the wireless power receiving device 720, such as during paging cycles or during packet exchanges of an ongoing call. Reducing the wireless power coupling may include de-tuning the wireless power antenna of the wireless power receiving device 720, reducing the radiated field from the wireless power transmitter, turning off the wireless power transmitter, or any combination thereof.

Figure 10:
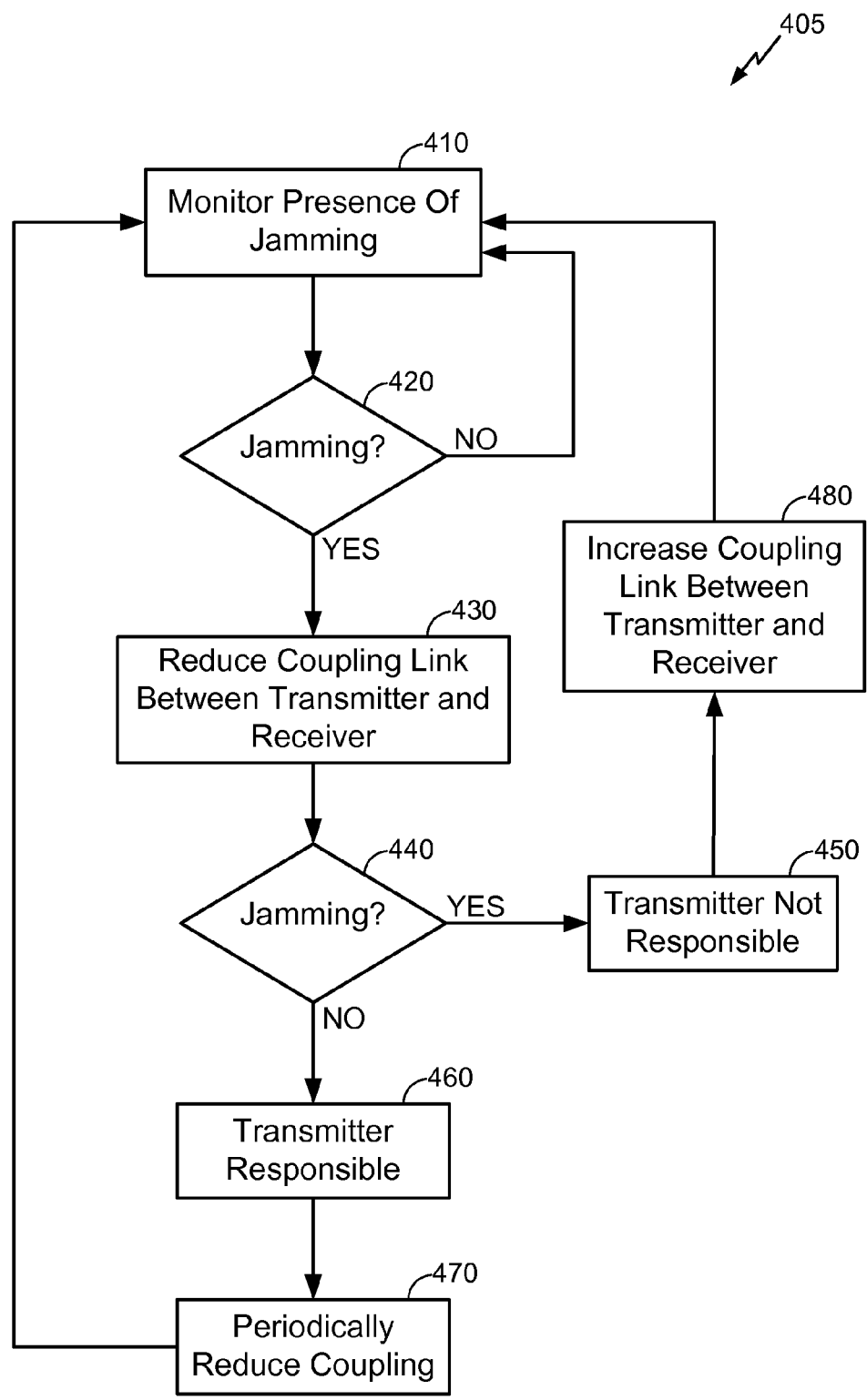
FIG. 10 is a flow chart illustrating a method for reducing jamming of a device caused by a wireless power transmitter, according to an exemplary embodiment of the present invention.

FIG. 10 illustrates a flow chart 405 showing a method for reducing jamming of a wireless power receiving device 720 caused by a wireless power transmitter according to an exemplary embodiment of the present invention. The presence of jamming of the wireless power receiving device 720 is monitored 410. In an exemplary embodiment, the wireless power receiving device 720 may monitor communication channels such as the PICH, or a pilot channel such as Common Pilot Channel (CPICH) for the wireless power receiving device's 720 Carrier Energy to Interference Energy ratio (Ec/Io). In another example during a call situation, the device may monitor quality of the link to see if there is a degraded carrier to noise ratio during transmission of data packets.

A decision 420 is made whether or not there is jamming at the device. Continuing the above example with monitoring the Ec/Io ratio of the PICH, there exists an expected typical value for an unjammed case. Thus, the decision regarding whether jamming exists may be based on determining whether the Ec/Io ratio has fallen below a pre-defined acceptable threshold level. If the Ec/Io ratio falls below the pre-defined threshold level, then the presence of jamming has been identified. Such a threshold level for the Ec/Io ratio may be set, for example, at approximately −16 dB. Similarly, a threshold may be set for a degraded carrier to noise ratio during a call situation.

If there is not jamming at the receiver, then monitoring 410 of the wireless power receiving device 720 for jamming may continue. If jamming exists, then a further test may be implemented to detect if the jamming is being caused by the wireless power transmitter, or if jamming is a result of another jamming device in the environment. In other words, an initial determination of jamming may only be a determination regarding the existence of the jamming, and not necessarily regarding the source of the jamming. For example, other jamming influences may be present in the environment. Thus, if the presence of jamming has been determined 420, the wireless power transmitter may be identified as merely a suspect in the jamming.

To determine if the wireless power transmitter is a significant cause of the jamming, the wireless power coupling link between wireless power receiver and wireless power transmitter is reduced 430 (i.e., wireless power coupling is at a reduced coupling level). Reducing the wireless power coupling link may occur by muting the wireless power transmitter, such as reducing the strength of the generated radiated field 106 or by turning the transmitter off for a period of time. Alternatively, or in addition, the antenna 304 (FIGS. 6-7) of the wireless power receiver may be de-tuned to reduce or eliminate wireless coupling between the wireless power transmitter and wireless power receiver. De-tuning the antenna 304 of the wireless power receiver may have the effect of cloaking the wireless power receiver and reducing the received power to the wireless power receiving device. A partial cloak at the receiver may also reduce wireless power coupling by back biasing the rectifier diodes and reducing the internal interference. As another example, receiver diodes may be back-biased to reduce the wireless power coupling.

During the time when the receiver 300 and transmitter 200 are disconnected or in a reduced coupling mode, a determination 440 is made whether there is still the presence of jamming at the wireless power receiving device 720. Continuing the above example with the PICH, the Ec/Io may be re-measured and compared against a pre-determined threshold level (e.g., −16 dB) to determine whether or not the jamming still exists. In an in-call situation, the degrading of the carrier-to-noise ratio may be re-measured to determine if reducing the wireless power coupling level has remedied the forward link problem.

If the jamming still exists (e.g., Ec/Io is still below the exemplary pre-defined −16 dB threshold) then a determination 450 is made that the wireless power charger 710 is not the cause of (or at least not a major contributor to) the jamming of the device. The wireless power coupling link between wireless power receiver and wireless power transmitter may then be increased 480 to resume charging at an increased wireless power coupling level, and the wireless power receiving device 720 may then return to monitor 410 the presence of jamming. In that event, such a return to monitoring may occur after some delayed period of time. The wireless power receiving device 720 may alternatively exit completely from this monitoring loop.

If the jamming does not still exist with wireless power coupling link disconnected or in a reduced coupling mode (e.g., Ec/Io has moved above the exemplary pre-defined −16 dB threshold) then a determination 460 is made that the wireless power charger is the cause of (or at least a major contributor to) the jamming of the device. In that event, the wireless power coupling link for the wireless power charger 710 and the wireless power receiving device 720 is periodically reduced 470 (i.e., wireless power coupling is at a reduced coupling level) during times of communication data reception at the wireless power receiving device 720. Being at a reduced wireless power coupling level may include a complete disconnect or de-coupling of wireless power transmission/reception between the wireless power charger 710 and the wireless power receiving device 720.

For example, the wireless power transmitter may be instructed to be muted, including being reduced in power transmission or turned off during the paging channel time slots (e.g., PICH time slots.) In an exemplary embodiment, the wireless power transmitter may be in communication with the wireless power receiving device 720, such as via load modulation to reduce wireless power coupling. Alternatively, the wireless power transmitter may be controlled to be muted by internal processor (e.g., 214, FIG. 4) based on an instruction received from the wireless power receiving device 720, or alternatively, based on an instruction received from another entity. Additionally, a reduced wireless power coupling level may be achieved by de-tuning the wireless power antenna of the wireless power receiving device 720.

For acts 430 and 440, it may be desirable to first attempt to reduce the coupling by de-tuning the wireless power antenna of the wireless power receiving device 720. De-tuning the wireless power antenna of the wireless power receiving device 720 may provide a sufficient reduction in jamming to cure the jamming condition in the individual wireless power receiving device if the jamming harmonics were created in the wireless power receiver itself, or if harmonics are more strongly coupled when the wireless power receiver is turned on. Achieving a sufficient reduction in jamming by de-tuning the wireless power antenna of the wireless power receiving device 720 would be beneficial as reducing jamming would be accomplished without interfering with the field generated by the wireless power transmitter. Reducing jamming in such a way may be beneficial when there are multiple wireless power receiving devices which may then receive a more continuous and efficient charge. De-tuning the wireless power antenna of the wireless power receiving device 720 may also be advantageous as de-tuning the wireless power antenna of the wireless power receiving device 720 may reduce the burden of maintaining bidirectional data transfer with the wireless power charger 710. However, in some cases de-tuning the wireless power antenna of the wireless power receiving device 720 may not be sufficient or desirable. In those cases, muting the wireless power transmitter may be used in addition, or in the alternative, to de-tuning the wireless power antenna of the wireless power receiving device 720.

To illustrate the efficiency of various embodiments, different calculations may be used. In an embodiment where only one device is present, muting of the wireless power transmitter may allow an approximate 99% charging rate for the device while still receiving pages. For example, in a Discontinuous Reception Cycle (DRX), the device may wake up every 1.28 seconds and demodulate the PICH. 1.28 seconds may be an approximate recommended system setting, but that interval may be a settable system parameter which may vary depending on the requirements of the system and service provider. The duration to receive the page and demodulate the page may be approximately 6 msec. Thus, the percentage of time that a page may be on during a DRX mode may be approximately 6/1280 or approximately 0.5% of the time. This percentage may also be the percentage of time that the wireless power coupling may be reduced or shut off to prevent jamming from the wireless power transmitter, which may result in an approximate 99% charging rate for the wireless power receiving device 720.

In another exemplary embodiment when multiple wireless power receiving devices 720 are present, a slightly lower charging rate may exist than with just one such device. For example, with five wireless power receiving devices 720, a DRX mode may allow charging approximately 97% of the time. Paging time slots may be different for one or more of each of the wireless power receiving devices 720. In that case, the probability of muting for each device remains approximately 6/1280 independently of each other. However, because the paging time slots may not be synchronized between the different wireless power receiving devices 720, the wireless power transmitter may be muted at different times for each of the five exemplary devices, the combination of which may have an approximate 97% charging rate. This is of course, assuming the embodiment where the wireless power transmitter is muted to generate a reduced radiated field or to be completely turned off for the requisite period of time. However, if it is sufficient to reduce jamming of one or more wireless power receiving devices by de-tuning the antennas of the jammed wireless power receiving device during the expected time of communication, the wireless power transmitter may remain on and provide wireless power for the other wireless power receiving devices 720 which are either not being jammed, or not in their communication modes.

A wireless power receiving device 720 may use its subscriber's identity, such as the International Mobile Subscriber's Identity (IMSI) to calculate its paging occasion. Service provider may decide where to set the parameters. Specific values used herein are to be seen as exemplary. Each service provider may choose parameters such as duration and periodicity of pages, what level of interference is tolerable, and what level of interference is not acceptable. Thus, the service provider may be able to determine the charging rate based on the service provider's desired paging requirements, and acceptable interference values. In other words, pages may be provided to the wireless power receiving device 720 at known periodic times, a service provider may alter those times based on the service provider's own preferences and requirements for paging and wireless charging.

For in-call jamming, the charging system may be less efficient because the wireless power receiving device 720 may be required to be receiving data packets on the communication link for a greater period of time than the amount of time needed to receive pages. In some cases, charging (i.e., wireless power coupling links) may be required to be reduced or even completely disconnected during the entire call rather than just at moments of data packet transmission/reception.

This method may be continuous during the operation of the wireless power receiver, however, the method may be initiated once the wireless power receiver detects that the wireless power receiver is in the near field of the wireless power transmitter. In that case, once the wireless power coupling is recognized, the wireless power receiving device 720 may begin monitoring to see if the wireless power transmitter, or a combination of the wireless power transmitter and wireless power receiver, is causing jamming of the wireless power receiving device 720. Once the wireless power receiving device 720 is removed from the charging field, the wireless power receiving device 720 may recognize that the wireless power transmitter is likely not a cause of jamming and the wireless power receiving device 720 may stop monitoring for jamming related to the radiated field generated by the transmitter of the wireless power charger 710. Additionally, if attempts to remedy the jamming of the wireless power receiving device 720 are unsuccessful, the wireless power receiving device 720 may stop monitoring for a period of time and remain in a continuous charging field until physically removed. The wireless power receiving device 720 may, after a sufficiently long period of time, be configured to monitor again to see if conditions have changed which may permit jamming to be remedied.

If a jamming condition by the wireless power charger 710 was determined, and the wireless power charger 710 and wireless power receiving device 720 are periodically reduced in coupling (e.g., synchronized with the communication transmission/reception of the wireless power receiving device 720), it may be desirable to periodically retest to see if conditions of jamming have changed. In such a case, it may be desirable to exit and start over at act 410 and monitor the presence of jamming. The period to re-test may be a standard period, but it may also be variable depending on the different service provider. Periodically re-testing may better maximize the percentage of time that the one or more wireless power receiving devices are charged with wireless power.

The approach described herein is applicable to variety of communication standards such as CDMA, WCDMA, OFDM, 802.11, GPS, Bluetooth, LTE, LTE Advanced, and the like. Those of ordinary skill in the art would understand that information and signals may be represented using any of a variety of different technologies and techniques. For example, data, instructions, commands, information, signals, bits, symbols, and chips that may be referenced throughout this detailed description may be represented by voltages, currents, electromagnetic waves, magnetic fields or particles, optical fields or particles, or any combination thereof.

Those of ordinary skill will appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of receiving power from a wireless power charger, comprising:
   receiving power wirelessly from the wireless power charger at a first wireless communication device at a first power level that can charge the first wireless communication device;
   monitoring interference over a communication channel of the first wireless communication device caused by a field generated by the wireless power charger; and
   receiving power wirelessly from the wireless power charger at a second power level that can charge the first wireless communication device if the monitored interference over the communication channel of the first wireless communication device is greater than a threshold, the second power level less than the first power level.

2. The method of claim 1, wherein monitoring interference includes monitoring interferences caused by at least one of harmonic energy, inter-modulation products, high voltages or baseband coupling to detect jamming of the communication channel of the first wireless communication device caused by the field generated by the wireless power charger.

3. The method of claim 2, wherein detecting jamming includes:
   monitoring a first interference level over the communication channel of the first wireless communication device when the first wireless communication device receives power wirelessly at the first power level;
   monitoring a second interference level over the communication channel when the first wireless communication device receives power wirelessly at the second power level; and
   detecting jamming based on the first and second interference levels.

4. The method of claim 1, wherein the monitoring interference includes monitoring an energy-to-interference ratio of a paging channel of the first wireless communication device.

5. The method of claim 1, wherein the monitoring interference includes monitoring a signal-to-noise ratio during a communication over the communication channel with the first wireless communication device.

6. The method of claim 4, wherein jamming is detected when the energy-to-interference ratio of the paging channel is less than a pre-determined threshold.

7. The method of claim 5, wherein jamming is detected when the signal-to-noise ratio of the communication channel is less than a pre-determined threshold.

8. The method of claim 1, wherein receiving power wirelessly from the wireless power charger at the second power level less than the first power level includes de-tuning an antenna associated with a wireless power receiver of the first wireless communication device.

9. The method of claim 1, wherein receiving power wirelessly from the wireless power charger at the second power level less than the first power level includes reducing a power level of the field generated by the wireless power charger.

10. The method of claim 9, wherein reducing the power level of the field generated by the wireless power charger includes disabling transmission of the field generated by the wireless power charger.

11. The method of claim 1, further comprising:
    receiving power wirelessly at a second wireless communication device at the first power level that can charge the second wireless communication device;
    monitoring interference over a communication channel of the second wireless communication device caused by the field generated by the wireless power charger; and
    receiving power wirelessly from the wireless power charger at the second wireless communication device at a second power level that can charge the second wireless communication device if the monitored interference over the communication channel of the second wireless communication device is greater than a threshold, the second power level less than the first power level.

12. The method of claim 11, further comprising receiving power wirelessly from the wireless power charger at the first wireless communication device at the first power level while receiving power wirelessly from the wireless power charger at the second wireless communication device at the second power level.

13. The method of claim 1, wherein wireless power is received at the second power level in response to a communication transmitted from the first wireless communication device to the wireless power charger.

14. A wireless communication device configured to receive power from a wireless power charger, the device comprising:
    a wireless power receiver configured to receive power wirelessly from a wireless power transmitter of the wireless power charger at a first power level that can charge the wireless communication device; and
    a processor configured to:
      monitor interference over a communication channel of the wireless power receiver caused by a field generated by the wireless power transmitter; and receive power wirelessly from the wireless power charger at a second power level that can charge the wireless communication device if the monitored interference over the communication channel of the wireless power receiver is greater than a threshold, the second power level less than the first power level.

15. The wireless communication device of claim 14, wherein the processor is further configured to monitor interferences caused by at least one of harmonic energy, intermodulation products, high voltages or baseband coupling to determine a condition of jamming resulting from the field generated by the wireless power transmitter, and receive power wirelessly from the wireless power charger at the second power level less than the first power level when the condition of jamming exists.

16. The wireless communication device of claim 14, wherein the processor is configured to de-tune an antenna associated with the wireless power receiver to receive power wirelessly from the wireless power charger at the second power level less than the first power level.

17. The wireless communication device of claim 14, wherein the processor is configured to transmit a command to the wireless power charger to reduce the field enerated b the wireless s ower transmitter to receive power wirelessly from the wireless power charger at the second power level less than the first power level.

18. The wireless communication device of claim 17, wherein the command is configured to inhibit the field generated by the wireless power transmitter.

19. The wireless communication device of claim 14, wherein the communication channel comprises a paging channel.

20. The wireless communication device of claim 14, wherein the communication channel transmits and receives data packets during communication over the communication channel.

21. The wireless communication device of claim 14, wherein the communication channel is configured to receive communication data from a communication link with an external device including at least one of a base station, satellite, server, personal computer, or a personal electronic device.

22. The wireless communication device of claim 21, wherein the communication link is configured according to at least one of CDMA, WCDMA, OFDM, 802.11, GPS, Bluetooth, LTE, LTE Advanced, or a near-field communication link.

23. A wireless power charger, comprising:
a wireless power transmitter configured to generate a field and provide wireless power to a wireless power receiving device that can charge the wireless power receiving device; and
a processor in communication with the wireless power transmitter and configured to:
receive communication data indicating that the field generated by the wireless transmitter causes jamming of a communication channel of the wireless power receiving device; and
reduce a power level of the field generated by the wireless power transmitter from a first power level to a second power level that can charge first wireless communication device in response to the received communication data.

24. The wireless power charger of claim 23, wherein the processor is configured to reduce the power level of the field generated by the wireless power transmitter when a condition of jamming exists in a communication channel of the wireless power receiving device.

25. The wireless power charger of claim 23, wherein the processor is configured to reduce the power level of the field generated by the wireless power transmitter by inhibiting the field generated by the wireless power transmitter.

26. The wireless power charger of claim 23, further including a receive antenna in communication with the processor, wherein the receive antenna is configured to receive commands from an external device that can control the reduction of the power level of the field generated by the wireless power transmitter.

27. The wireless power charger of claim 23, wherein the processor is further configured to control the reduction of the power level of the field generated by the wireless power transmitter during times of receiving communication data by the wireless power receiving device.

28. The wireless power charger of claim 27, wherein times of receiving communication data by the wireless power receiving device occurs during assigned paging for the wireless power receiving device.

29. The wireless power charger of claim 26, wherein the external device is the wireless power receiving device.

30. The wireless power charger of claim 23, wherein the communication data is received from the wireless power receiving device.

31. An apparatus for receiving power from a wireless power charger, comprising:
means for receiving power wirelessly from the wireless power charger at a first wireless communication device at a first power level that can charge the first wireless communication device;
means for monitoring interference over a communication channel of the first wireless communication device caused by a field generated by the wireless power charger; and
means for reducing the received wireless power from the first power level to a second power level that can charge the first wireless communication device if the monitored interference over the communication channel of the first wireless communication device is greater than a threshold, the second power level less than the first power level.

32. The apparatus of claim 31, wherein wireless power is received at the second power level in response to a communication transmitted from the first wireless communication device to the wireless power charger.

* * * * *

UNITED STATES PATENT AND TRADEMARK OFFICE
CERTIFICATE OF CORRECTION

PATENT NO. : 8,929,957 B2
APPLICATION NO. : 12/613374
DATED : January 6, 2015
INVENTOR(S) : Stanley Slavko Toncich et al.

It is certified that error appears in the above-identified patent and that said Letters Patent is hereby corrected as shown below:

In the claims

At column 19, line 22, please delete "enerated b" and insert --generated by--, therefor.

At column 19, line 23, please delete "wireless s ower" and insert --wireless power--, therefor.

Signed and Sealed this
Twenty-second Day of March, 2016

Michelle K. Lee
*Director of the United States Patent and Trademark Office*